Figure 6:
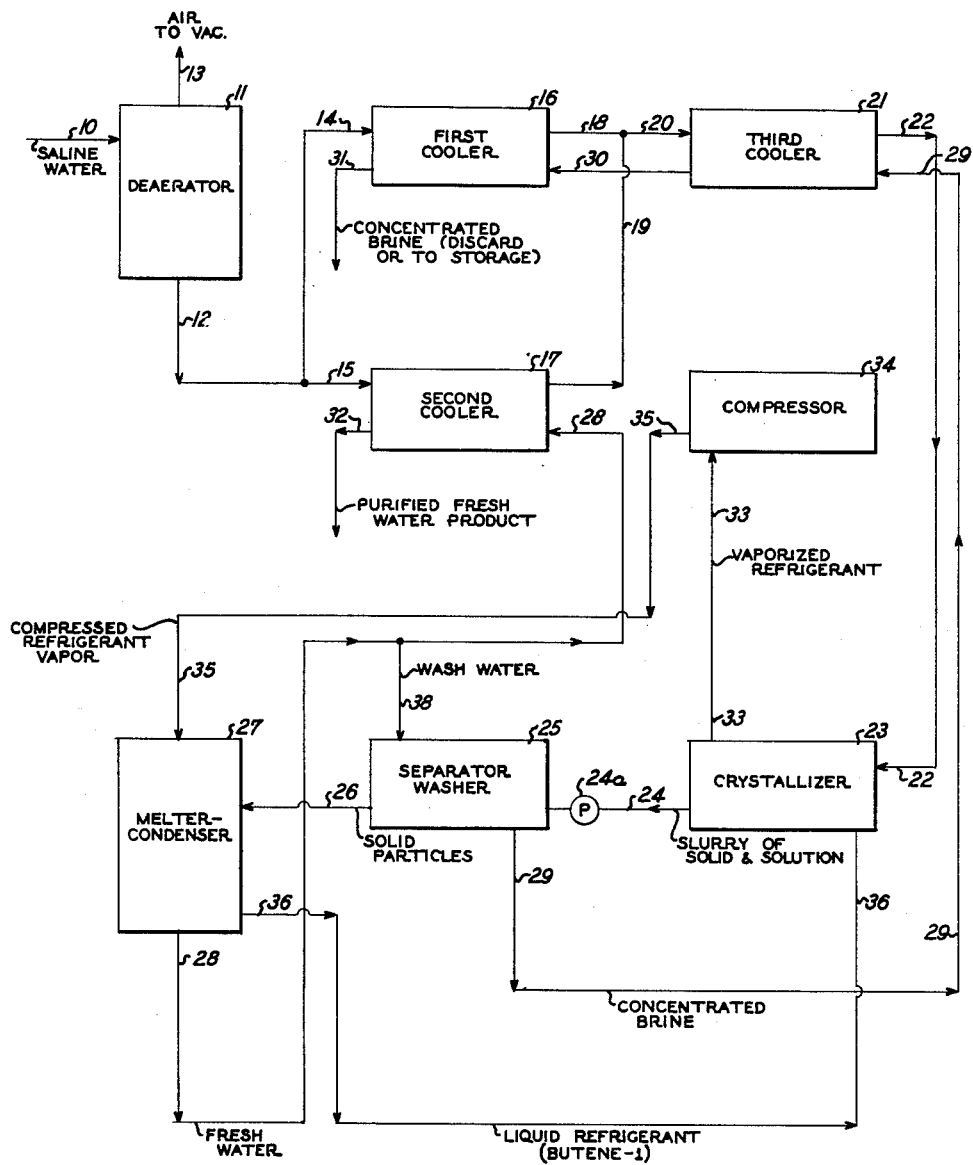

Sept. 29, 1964  I. B. MARGILOFF  3,150,499
APPARATUS FOR REFRIGERATING SALINE WATER
Filed Jan. 23, 1961  2 Sheets-Sheet 1
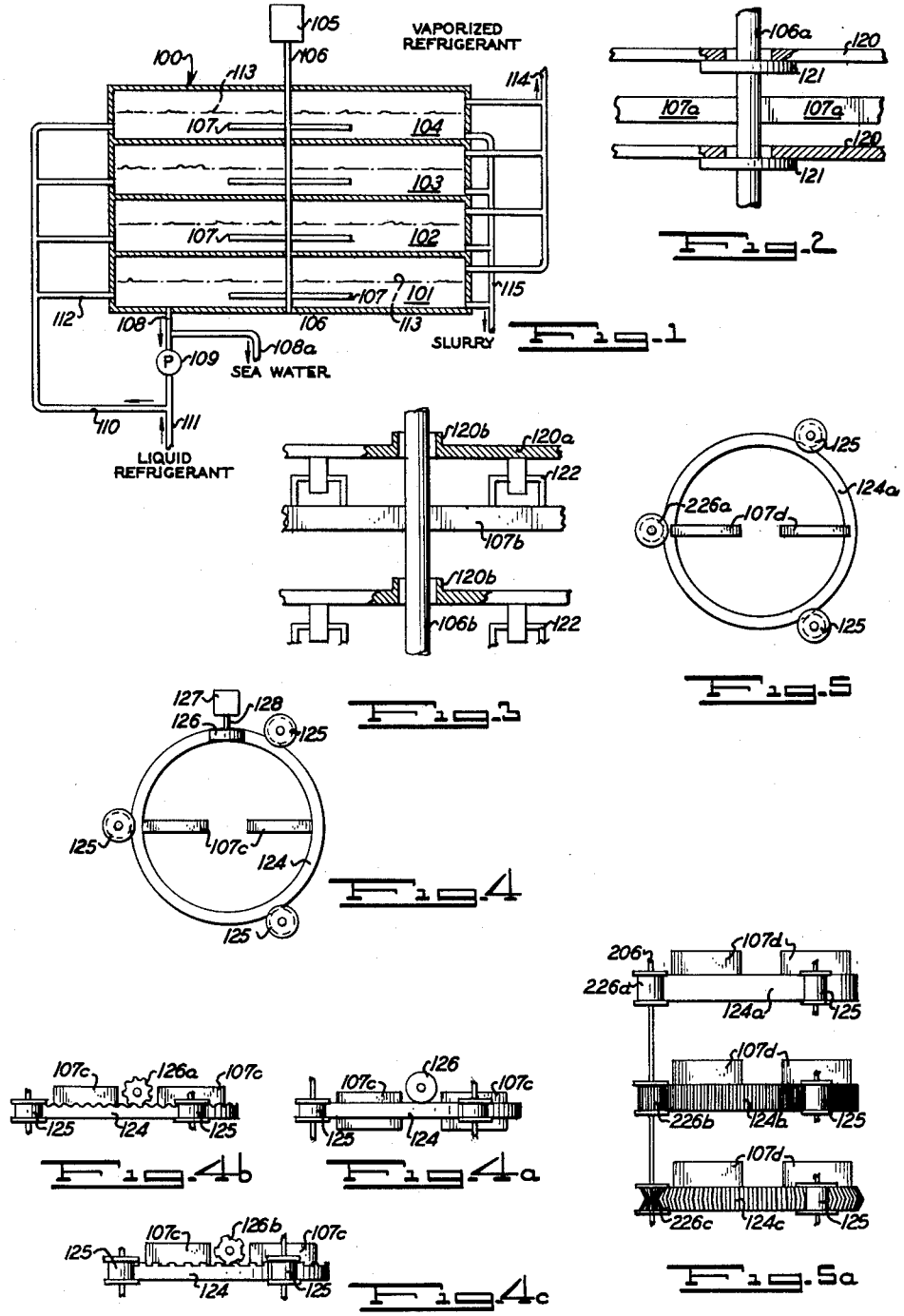

U̲n̲i̲t̲e̲d̲ S̲t̲a̲t̲e̲s̲ P̲a̲t̲e̲n̲t̲ O̲f̲f̲i̲c̲e̲

3,150,499
Patented Sept. 29, 1964

3,150,499
APPARATUS FOR REFRIGERATING
SALINE WATER
Irwin B. Margiloff, New York, N.Y., assignor to Halcon International, Inc., a corporation of Delaware
Filed Jan. 23, 1961, Ser. No. 84,251
1 Claim. (Cl. 62—123)

This invention relates to apparatus for use in processes for treating solutions in order to separate solvent therefrom, more particularly in processes for preparing fresh or potable water from sea water or brackish water (having over 500 p.p.m. of solute) wherein the saline water is partially frozen, by evaporation of a water-immiscible refrigerant in contact therewith, the resulting ice is separated from the remaining salt water, and this ice is melted to give fresh or potable water, and especially to such apparatus including an enclosure which is adapted to contain at least two bodies of liquid, one above the other, and processes wherein such liquid bodies are treated simultaneously.

Various proposals have been made for recovering potable water from sea water or the like materials, including direct or indirect cooling and freezing and separation of frozen relatively pure water from the more concentrated liquid saline water. However, these processes are relatively costly, especially as to the capital investment, and accordingly their commercialization has been retarded. The art is confronted by the problem of providing apparatus for use in processes for the recovery of fresh or potable water from saline water at economically low operating costs and at an attractively low capital investment.

The discoveries associated with the invention relating to solution of the above problems and the objects achieved in accordance with the invention as described herein include the provision of:

An apparatus adapted for use in refrigerating a liquid comprising the combination of a rigid enclosure adapted to contain at least two separate bodies of liquid, one above the other, means for introducing liquid to be refrigerated and means for introducing liquid refrigerant into each body of liquid, means for removing a mixture containing refrigerated liquid from each body of liquid, and means for removing vaporized refrigerant from above each body of liquid;

Such an apparatus including means for agitating the liquid mixture;

Such an apparatus wherein the agitating means includes a paddle adapted to mix frozen liquid particles with the liquid;

Such an apparatus including a shaft carrying paddles;

Such an apparatus including rings carrying paddles;

Such an apparatus wherein the means for introducting refrigerant is at least about 18 inches below the nearest top level of a liquid body;

Such an apparatus wherein the means for introducing liquid to be refrigerated leads to the means for introducing refrigerant;

Such an apparatus each section of which is adapted to contain liquid at a depth of about 18 inches;

Such a process for the production of fresh water from saline water by crystallization of a part of the water therein as fresh water crystals followed by separation of the crystals from the residual saline water, including the improvement of simultaneously refrigerating at least two separate bodies of water, one above the other, by direct contact with a boiling liquid refrigerant;

Such a process wherein the major part of the liquid in each body is at a depth of about 18 inches;

Such a process wherein the refrigerant is introduced at least 18 inches below the nearest top level of a liquid body; and Other objects which will be apparent as details or embodiments of the invention are set forth hereinafter.

FIGURES 1, 2 and 3 are schematic illustrations or preferred embodiments of the crystallizers of the invention, and FIGURE 6 is a schematic illustration of an overall system. FIGURES 4 and 5 are plan views of agitators, FIGURE 4a is a side elevational view and FIGURES 4b and 4c are modifications of FIGURE 4, and FIGURE 5a is a side elevational view of FIGURE 5.

In the overall system, as illustrated in FIGURE 6, saline water (having more than 500 p.p.m. solute) enters through line 10. It is deaerated in vessel 11 by the application of vacuum and heat or steam. Air and other non-condensible dissolved gases pass out through the vacuum line 13. A portion (e.g. about two thirds) of the deaerated saline water is passed through lines 12 and 14 into a first cooler 16 and the remainder is passed through line 15 into a second cooler 17. The cooled outlet saline water from both coolers is led through lines 18 and 19 and passed through line 20 into third cooler 21. The outlet cooled saline water from third cooler 21 is passed through line 22 into crystallizer 23. The saline water is crystallized by methods such as evaporative freezing in the crystallizer in order to produce ice crystals and brine, e.g., a liquid refrigerant (such as butene-1) is mixed therewith and vaporized. The ice crystals and brine are led through line 24 into separator-washer 25 and after separation of the brine e.g., by gravity or centrifugal filtration and washing (with wash liquor added through line 38) to remove entrained brine, the ice crystalls are passed through line 26 into melter-condenser 27 where by direct heat exchange the crystals are melted to form fresh water which is passed through line 28 into the cooling side of the second cooler 17 in order to cool the saline water passing into the second cooler.

The fresh water passes out of the second cooler 17 through line 32 and is taken off as fresh water product; i.e., of not over 500 p.p.m. of solute.

The brine is removed from the separator-washer 25 through line 29 is first passed through the cooling side of third cooler 21 and is then passed through line 30 into the cooling side of first cooler 16 to cool the saline water. The brine passing out of first cooler 16 is then removed through line 31.

The refrigerant vapors are passed from the crystallizer 23 via line 33 to compressor 34, and compressed. The compressed vapor is passed via line 35 to vessel 27 where it is liquefied, and the liquid refrigerant is passed via line 36 to the crystallizer 23.

In order to indicate still more fully the nature of the present invention, the following examples of typical procedures are set forth, it being understood that these examples are presented as illustrative only and are not intended to limit the scope of the invention.

*Example 1*

The crystallizer 100 used in this example (as shown in FIGURE 1) includes sections 101, 102, 103 and 104, each of which holds a shallow pool of liquid with a rather large surface area. The pool may be circular or of any other convenient shape. Each section may be made of metal or the like material, the assembly set on concrete on or in the ground, and each section may be lined with a neoprene or the like material. The agitation means includes one or more blades 107 each connected to shaft 106 provided with suitable bearings and seals (not shown), and motor 105 provided with a suitable support. The liquid to be refrigerated is introduced via line 108a, and the refrigerant liquid is introduced via line 111. In the normal operation of the crystallizer, the liquid therein is at about a height of 18 inches, indicated by 113. A slurry of solid and liquid is withdrawn via line 115. Some liquid may be withdrawn via line 108, passed through pump 109 (with feed), mixed with refrigerant and passed via lines 110 and 112 to the crystallizer. The feed and withdrawal lines are provided with valves and usual fixtures (not shown). The refrigerant mixture is initially under a hydrostatic head of at least about 18 inches, to avoid boiling at the refrigerant feed point.

Raw sea water (e.g., having 3.5 percent dissolved solids) is fed into a deaeration column operated at about 10 mm. Hg and air is stripped and removed overhead. The deaerated sea water passes out of the bottom of the column at 54° F. and is split into two streams, approximately one-third passing through a first cooler and the remainder passing through a second cooler. The coolers are sized so that the deaerated waters passing out of both coolers are at the same temperature, 38.2° F. The two outlet streams are combined and passed into a third cooler where they are cooled to a temperature of 34.2° F., and the resulting liquid is passed into the crystallizer 109 via line 108a. Liquid commercial butene (or butene-1) is introduced into the crystallizer via line 111 and directly contacted with the cooled deaerated water to form ice crystals and brine. The temperature in the bulk of the liquid in the crystallizer is maintained at 26.3° F. by efficient agitation of the mixture in the crystallizer. Vaporized butene is removed overhead via line 114 at a temperature of 26.3° F. and passed to a compressor. A mixture of ice crystals and brine is removed via line 115.

It may be passed onto a continuous moving filter belt from which the bulk of the brine is drained by gravity flow from the first section of the moving belt. The ice crystals containing entrained brine are then washed with water to remove the brine. The washing may be in several stages, the first with sea water, the second with lower salinity water, and so on, the last wash being of low enough salinity so that the melted crystals yield water of the desired low salinity. The washed ice crystals are passed through a chute (as a slurry in water if desired) or conveyed by a bucket or screw conveyor into a melter-condenser where they are contacted with the butene vapor which condenses during the contacting step. Part of the fresh water is passed into the separator-washer to supply the wash water and the remainder passes out of the bottom of the melter-condenser at 33° F. and is led through the cooling side of the first cooler. The fresh water leaves the oulet side of the first cooler at 48.8° F. and is stripped of dissolved butene in a fresh water stripper operated at about 10 mm. Hg. The stripped fresh water is removed from the bottom of the stripper (not shown) and collected as product. There is obtained an overall yield of fresh water (having not over 500 p.p.m. of solute) of approximately one-third by weight of the raw sea water feed.

The brine which is separated from the ice crystals on the moving belt is passed through the third cooler at a temperature of 27° F., and is then passed into the cooling side of the second cooler at a temperature of 33° F. The brine leaves the outlet side of the second cooler at 48.6° F. and is stripped of dissolved butene in a stripper (not shown) operated at about 10 mm. Hg and passes out of the bottom of the stripper at 54° F. as spent brine. The stripped butene from the brine and the fresh water strippers is compressed, condensed and passed back into the crystallizer.

*Example 2*

The crystallizer used in this example is generally analogous to that of FIGURE 1, but includes supports as shown in FIGURE 2. The shaft 106a is provided with fixed support plates 121 which support septums 120 (bottoms of second, third and fourth sections). It is also provided with paddles 107a. These may be made of metal, rubber, plastic, or the like.

The procedure set forth in Example 1 is repeated using this apparatus and similar results are obtained.

*Example 3*

The crystallizer used in this example is analogous to that of FIGURE 1 but includes support means as shown in FIGURE 3. The shaft 106b is provided with paddles 107b which carry caster units 122. The latter support septums 120a. The septums are provided with risers 120b around the shaft openings therein.

The procedure set forth in Example 1 is repeated using this apparatus and similar results are obtained.

*Example 4*

The apparatus of FIGURE 1 is constructed as indicated in FIGURE 4 to provide paddles 107c mounted on ring 124. This may be an inflatable rubber tire, or tube with paddles attached thereto, or the tire may be mounted on a ring or support to which the paddles are attached. The latter is rotated by wheel or driver 126 connected via shaft 128 (passing through the section wall) with motor 127. The ring is guided by supported idlers 125, and these may have flanges to provide vertical support for the ring. Alternatively, separate support rolls may be used. FIGURE 4b shows a corrugated wheel 126a, FIGURE 4a shows a smooth wheel 126, and FIGURE 4c shows a toothed wheel 126b. The idlers rotate on rods or shafts attached to the section wall. Usual packings, bearings, and fixtures are not shown.

Alternatively as shown in FIGURES 5, and 5a, a vertical shaft 206 set inside and near the edge of the crystallizer may be used to rotate rings 124a carrying paddles 107d via wheels 226 or 226a, 226b, and 226c. The latter show smooth, toothed and corrugated wheels, respectively, and wheel 226c is beveled. Wheels 226, 226a and 226b may be provided with flanges. Risers may be provided around the shaft similar to those shown in FIGURE 3. Any leakages around shaft openings pass to the next lower section and are withdrawn via line 108.

The procedure of Example 1 is repeated and similar results are obtained.

Liquid depths of about 18 inches are used. Greater depths are operative but unattractive from the economic viewpoint, especially as to the cost of compressing the refrigerant vapor.

Preferred refrigerants are butene-1 and commercial butene (which is a mixture of 95% butene-1 and 5% isobutene by volume). Other inert, water-immiscible materials boiling in the range of about 0° to 35° F. can be used in the process as well as close boiling mixtures of such refrigerants. A desirable boiling point range is 10° to 30° F., and 13° to 25° F. is a preferred boiling point range.

If desired, the conditions in the sections may be varied and the brine residue from one stage or section may be used as the feed to another section or stage operating at a lower temperature, as set forth in detail in U.S. application Ser. No. 75,958 filed December 15, 1960, entitled "Chemical Process."

The enclosure or assembly may be insulated if desired e.g. by a form of polyurethane, or the like.

In the present compact system, a relatively large vapor disengaging surface is provided relative to the volume of liquid. Instead of a filter belt, a centrifuge may be used, and also, a butene vapor treatment may be used instead of the water wash. These procedures are set forth in detail in U.S. application Ser. No. 77,675, filed December 22, 1960, entitled "Chemical Process and Apparatus."

It is indeed surprising that water desalinization may be carried out in such an efficient and economic manner in accordance with the invention and at such relatively low capital investment requirements.

In view of the foregoing disclosures, variations and modifications thereof will be apparent to one skilled in the art, and it is intended to include within the invention all such variations and modifications except as do not come within the scope of the appended claim.

What is claimed is:

An apparatus for refrigerating saline water which comprises: an enclosure; a plurality of sections, one above the other, within said enclosure, each of said sections being surface area and a depth of at least 18 inches; means for distributing aliquot portions of said saline water simultaneously to each of said sections; refrigerant inlet means adapted to introduce a liquid refrigerant at least 18 inches beneath the surface of said pools of liquid so as to maintain substantially uniform temperature in each of said pools of liquid; refrigerant outlet means for simultaneously withdrawing vaporized refrigerant; and outlet means for simultaneously withdrawing a refrigerated liquid containing ice crystals.

References Cited in the file of this patent

UNITED STATES PATENTS

| | | |
|---|---|---|
| 1,865,614 | Caldwell | July 5, 1932 |
| 2,683,178 | Findlay | July 6, 1954 |
| 2,904,511 | Donath | Sept. 15, 1959 |

FOREIGN PATENTS

| | | |
|---|---|---|
| 70,507 | Norway | June 3, 1946 |
| 801,102 | Great Britain | Sept 10, 1958 |

UNITED STATES PATENT OFFICE
CERTIFICATE OF CORRECTION

Patent No. 3,150,499 September 29, 1964

Irwin B. Margiloff

It is hereby certified that error appears in the above numbered patent requiring correction and that the said Letters Patent should read as corrected below.

Column 5, line 4, after "being" insert -- adapted to hold a shallow pool of liquid having a large --.

Signed and sealed this 12th day of January 1965.

(SEAL)
Attest:

ERNEST W. SWIDER
Attesting Officer

EDWARD J. BRENNER
Commissioner of Patents